US011867082B2

(12) United States Patent
Yadav et al.

(10) Patent No.: US 11,867,082 B2
(45) Date of Patent: Jan. 9, 2024

(54) ROTOR BLADE WITH DETACHABLE TIP

(71) Applicant: General Electric Company, Schenectady, NY (US)

(72) Inventors: Abhijeet Jayshingrao Yadav, Karad (IN); Nitesh Jain, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/236,236

(22) Filed: Apr. 21, 2021

(65) Prior Publication Data

US 2022/0341329 A1 Oct. 27, 2022

(51) Int. Cl.
*F01D 5/14* (2006.01)
*F01D 5/02* (2006.01)
*F01D 5/28* (2006.01)

(52) U.S. Cl.
CPC ............... *F01D 5/147* (2013.01); *F01D 5/02* (2013.01); *F01D 5/28* (2013.01); *F05D 2220/32* (2013.01); *F05D 2230/80* (2013.01); *F05D 2240/307* (2013.01); *F05D 2300/17* (2013.01)

(58) Field of Classification Search
CPC . F01D 5/147; F01D 5/02; F01D 5/005; F01D 5/20; F01D 5/282; F01D 5/284; F01D 5/225; F01D 5/18; F01D 25/005; F01D 5/28; F01D 5/22; F01D 11/122; F01D 5/141; F05D 2240/307; F05D 2230/90; F05D 2260/36; F05D 2300/6033; F05D 2220/32; F05D 2300/505; F05D 2230/80; F05D 2300/17; B23P 15/04; F04D 29/324; B23H 9/10; F05B 2260/3011
See application file for complete search history.

(56) References Cited

U.S. PATENT DOCUMENTS

| | | | | |
|---|---|---|---|---|
| 4,426,193 | A | 1/1984 | Carlson | |
| 4,808,076 | A | 2/1989 | Jarmon et al. | |
| 5,363,554 | A | 11/1994 | Partridge et al. | |
| 7,114,912 | B2 | 10/2006 | Gerez et al. | |
| 8,033,790 | B2 | 10/2011 | Vance | |
| 8,251,658 | B1 | 8/2012 | Diggs et al. | |
| 8,790,087 | B2 * | 7/2014 | Perkinson | F01D 5/147 416/224 |
| 8,974,884 | B2 * | 3/2015 | Fabre | B32B 38/0036 428/68 |
| 9,145,787 | B2 * | 9/2015 | Della-Fera | F01D 11/122 |
| 2012/0275924 | A1 * | 11/2012 | Perkinson | F01D 5/147 29/889.71 |
| 2015/0192029 | A1 | 7/2015 | Roberts, III et al. | |
| 2018/0298765 | A1 | 10/2018 | Beyer et al. | |
| 2019/0323364 | A1 | 10/2019 | Sippel et al. | |
| 2020/0208526 | A1 * | 7/2020 | Hafner | F01D 5/28 |

* cited by examiner

*Primary Examiner* — Eric J Zamora Alvarez
(74) *Attorney, Agent, or Firm* — Dority & Manning, P.A.

(57) ABSTRACT

A rotor blade for a gas turbine engine is provided. The rotor blade includes a blade body formed of a first material; and a tip component removably connected to the blade body, the tip component formed of a second material that is different than the first material.

17 Claims, 4 Drawing Sheets

ROTOR BLADE WITH DETACHABLE TIP

FIELD

The present subject matter relates generally to a gas turbine engine, or more particularly to a rotor blade of a gas turbine engine.

BACKGROUND

A gas turbine engine generally includes a turbomachine, the turbomachine including, in serial flow order, a fan section, a compressor section, a combustion section, a turbine section, and an exhaust section. During operation of the turbomachine, the gas turbine engine drives or otherwise rotates the rotor blades of these sections relative to a nacelle. The rotation of the rotor blades, in turn, generates a flow of pressurized air, which may support the operation of the gas turbine engine and/or be used as propulsive thrust for propelling an aircraft.

However, rubbing between a tip of a rotor blade and portions of the engine can result in the need to replace the entire rotor blade.

BRIEF DESCRIPTION

Aspects and advantages of the invention will be set forth in part in the following description, or may be obvious from the description, or may be learned through practice of the invention.

In one exemplary embodiment of the present disclosure, a rotor blade for a gas turbine engine is provided. The rotor blade includes a blade body formed of a first material; and a tip component removably connected to the blade body, the tip component formed of a second material that is different than the first material.

In certain exemplary embodiments the tip component defines an abradable exterior surface.

In certain exemplary embodiments the rotor blade includes a lock connected to the tip component and the blade body, the lock operable to selectively lock the tip component to the blade body.

In certain exemplary embodiments the lock is operable to selectively lock the tip component to the blade body so that movement of the tip component relative to the blade body in a radial direction and an axial direction is prevented.

In certain exemplary embodiments the tip component is removably connected to the blade body via the lock.

In certain exemplary embodiments the lock comprises a protrusion extending from the tip component; and a slot within the blade body, wherein the slot is sized to receive the protrusion to selectively lock the tip component to the blade body.

In certain exemplary embodiments the tip component is formed of a shape-memory alloy.

In certain exemplary embodiments a span dimension of the tip component is 10% or less of a span dimension of the blade body.

In certain exemplary embodiments a span dimension of the tip component is 20% or less of a span dimension of the blade body.

In certain exemplary embodiments the second material of the tip component is a less stiff material than the first material of the blade body.

In another exemplary embodiment of the present disclosure, a gas turbine engine is provided. The gas turbine engine includes a fan; and a rotor blade positioned within the fan, the rotor blade comprising: a blade body formed of a first material; and a tip component removably connected to the blade body, the tip component formed of a second material that is different than the first material.

In certain exemplary embodiments the tip component defines an abradable exterior surface.

In certain exemplary embodiments the rotor blade includes a lock connected to the tip component and the blade body, the lock operable to selectively lock the tip component to the blade body.

In certain exemplary embodiments the lock is operable to selectively lock the tip component to the blade body so that movement of the tip component relative to the blade body in a radial direction and an axial direction is prevented.

In certain exemplary embodiments the tip component is removably connected to the blade body via the lock.

In certain exemplary embodiments the lock comprises a protrusion extending from the tip component; and a slot within the blade body, wherein the slot is sized to receive the protrusion to selectively lock the tip component to the blade body In certain exemplary embodiments the tip component is formed of a shape-memory alloy.

In certain exemplary embodiments a span dimension of the tip component is 20% or less of a span dimension of the blade body.

In certain exemplary embodiments the second material of the tip component is a less stiff material than the first material of the blade body.

In an exemplary aspect of the present disclosure, a method is provided for repairing a rotor blade having a blade body for a gas turbine engine. The method includes removing a first tip component from the blade body when the first tip component is damaged; and connecting a second tip component to the blade body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
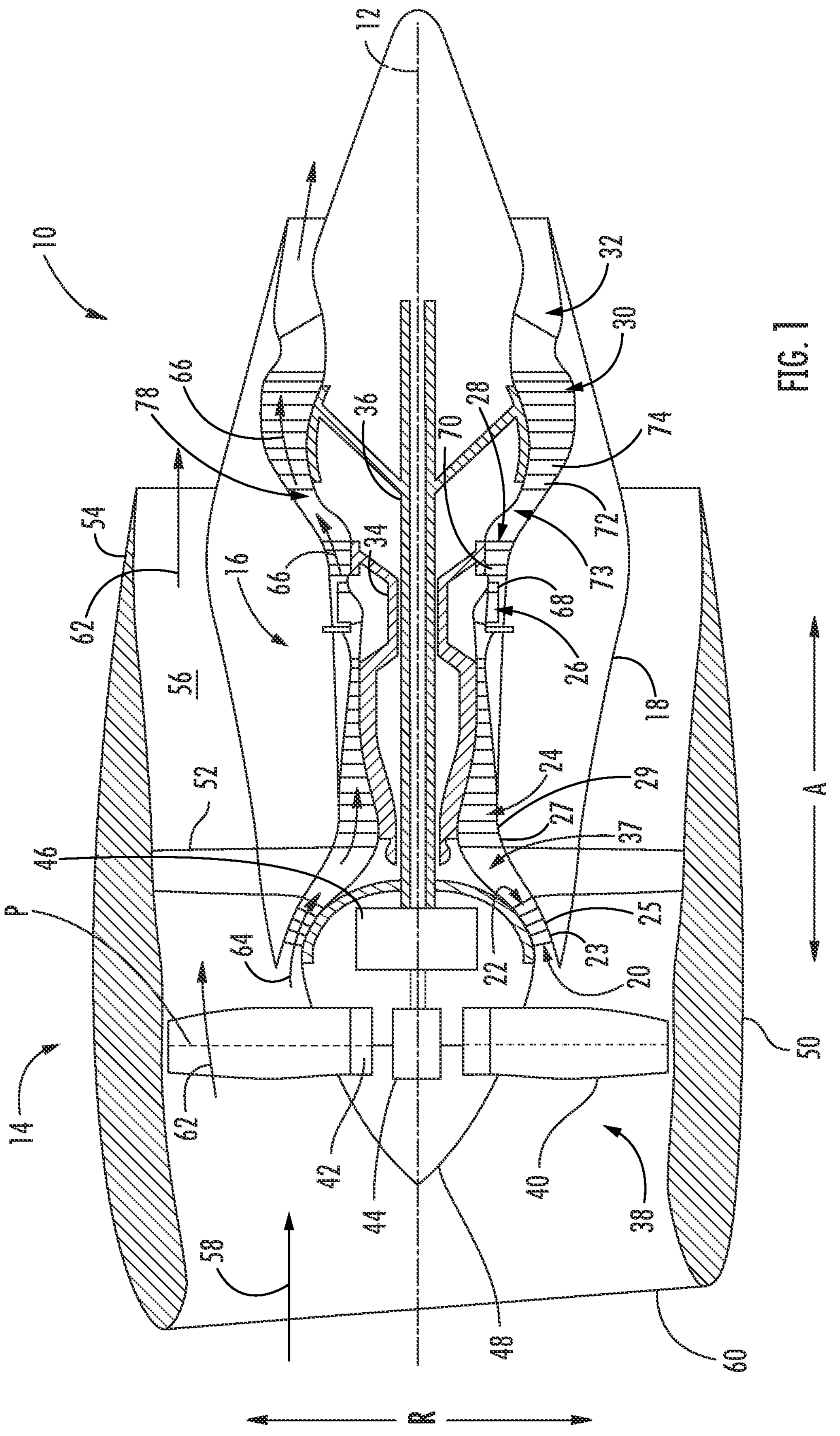
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A rotor blade of the present disclosure includes a blade body formed of a first material and a tip component removably connected to the blade body, the tip component formed of a second material that is different than the first material. As described above, rubbing between a tip of a rotor blade and portions of the engine can result in the need to replace the entire rotor blade. Advantageously, a rotor blade of the present disclosure only requires a worn tip to be replaced and not the entire rotor blade. For example, once a tip component is worn, the tip component can be removed from the blade body, and a new second tip component can then be connected to the same blade body.

A tip component of the present disclosure may be made of an abradable material. For example, the tip component defines an abradable exterior surface that is formed of an abradable material. In this manner, any rubbing between the tip component and portions of an engine will not wear the engine components and instead will wear down the tip component, which may then be replaced with a new tip component.

In other exemplary embodiments, a tip component of the present disclosure may be made of a shape-memory alloy that can be deformed during any rubbing between the tip component and portions of an engine but will return to its pre-deformed shape, for example, when heated. It is also contemplated that other materials may be used to form the tip component.

It is contemplated that the tip component of the present disclosure may have any desired geometry or shape to support various aerodynamic features and designs. It is contemplated that a first tip component having a first geometric shape can be removably connected to the blade body. When the first tip component having a first geometric shape is removed, a second tip component having a second geometric shape different than the first geometric shape can then be removably connected to the blade body.

It is also contemplated that the tip component may have any desired tip stiffness, i.e., tip frangibility, to support various features and designs. It is contemplated that a first tip component having a first tip stiffness can be removably connected to the blade body. When the first tip component having a first tip stiffness is removed, a second tip component having a second tip stiffness the same as the first tip stiffness can then be removably connected to the blade body. It is also contemplated that, in other exemplary embodiments, a second tip component may have a second tip stiffness that is different than the first tip stiffness.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough. Each compressor 22, 24 may, in turn, include one or more rows of stator vanes interdigitated with one or more rows of compressor rotor blades. Moreover, each turbine 28, 30 may, in turn, include one or more rows of stator vanes interdigitated with one or more rows of turbine rotor blades. In exemplary embodiments, the LP compressor 22 includes sequential stages of LP compressor stator vanes 23 and LP compressor rotor blades 25 and the HP compressor 24 includes sequential stages of HP compressor stator vanes 27 and HP compressor rotor blades 29. Furthermore, the LP turbine 30 includes sequential stages of LP turbine stator vanes 72 and LP turbine rotor blades 74 and the HP turbine 28 includes sequential stages of HP turbine stator vanes 68 and HP turbine rotor blades 70.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed. In an exemplary embodiment of the present disclosure, the fan 14 may include a number of rotor stages, each of which includes a row of fan blades or rotor airfoils mounted to a rotor having a rotatable disk. The fan 14 may also include at least one stator stage including a row of stationary or stator airfoils that serve to turn the airflow passing therethrough. As used herein, the term "fan" refers to any apparatus in a turbine engine having a rotor with airfoils operable to produce a fluid flow. It is contemplated that the principles of the present invention are equally applicable to multi-stage fans, single-stage fans, and other fan configurations; as well as with low-bypass turbofan engines, high-bypass turbofan engines, and other engine configurations.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, open rotor or unducted turbofan engine, a land-based gas turbine engine for power generation, an aeroderivative gas turbine engine, etc.

Figure 2:
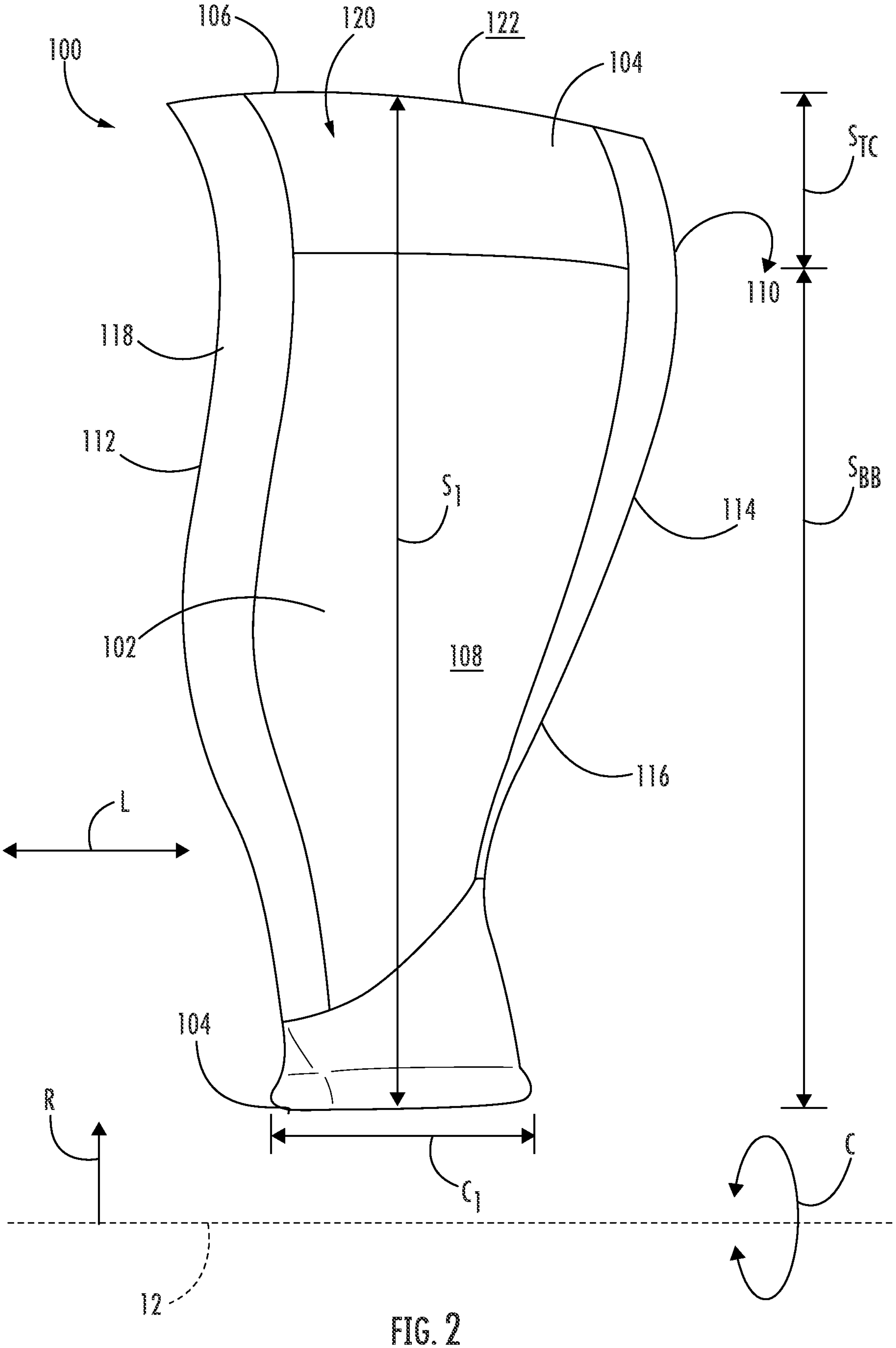
FIG. 2 is a side cross-sectional view of a rotor blade of a gas turbine engine in accordance with an exemplary embodiment of the present disclosure.

FIGS. 2-9 illustrate exemplary embodiments of the present disclosure. FIG. 2 is a side cross-sectional view of a rotor blade 100 in accordance with an exemplary embodiment of the present disclosure, which may be incorporated into the engine 10 in place of any of the fan rotor blades 40, the compressor rotor blades 25, 29 (FIG. 1), and/or the turbine rotor blades 70, 74 (FIG. 1). As shown, the rotor blade 100 defines a longitudinal direction L, a radial direction R, and a circumferential direction C. In general, the longitudinal direction L extends parallel to the axial centerline 12 of the engine 10, the radial direction R extends generally orthogonal to the axial centerline 12, and the circumferential direction C extends generally concentrically around the axial centerline 12.

Referring to FIGS. 2-6, in exemplary embodiments, the rotor blade 100 includes a blade body 102 and a tip component 120 that is detachably or removably connected to the blade body 102. The rotor blade 100 extends from a root section 104 to an extremity 106 along the radial direction R. As described herein, the tip component 120 forms a portion of the extremity 106 of the rotor blade 100. Furthermore, the rotor blade 100 includes a pressure-side surface 108 and an opposing suction-side surface 110. In this respect, the pressure side surface 108 and the suction side surface 110 are joined together or interconnected at a leading edge 112 of the blade body 102 and a trailing edge 114 of the blade body 102. The rotor blade 100 defines a periphery 116.

Referring to FIG. 2, each rotor blade 100 has a span, or span dimension, "S1" defined as the radial distance from the root 104 to the extremity 106, and a chord, or chord dimension, "C1" defined as the length of an imaginary straight line connecting the leading edge 112 and the trailing edge 114. Depending on the specific design of the rotor blade 100, its chord C1 may be different at different locations along the span S1. In one embodiment, a relevant measurement is the chord C1 at the root 104 of the rotor blade 100.

Additionally, as will be described below, the root section 104 secures the rotor blade 100 to a rotor disk (not shown) coupled to the LP shaft 36 (FIG. 1) or HP shaft 34 (FIG. 1). However, in alternative exemplary embodiments, the rotor blade 100 may have any other suitable configuration. For example, in one embodiment, the rotor blade 100 may include a platform positioned between the blade body 102 and the root section 104 along the radial direction R.

In an exemplary embodiment, the rotor blade 100 may also include a cap portion 118 that is disposed over a portion of the blade body 102 and over a portion of the tip component 120 as shown in FIG. 2. In one embodiment, the cap portion 118 may be formed of a metal material, although it is contemplated that the cap portion 118 may be formed of other protective materials as well.

Referring to FIGS. 2-6, in exemplary embodiments, the blade body 102 is formed of a first material and the tip component 120 that is removably connected to the blade body 102 is formed of a second material that is different than the first material.

In an exemplary embodiment, the blade body 102 is made of a material that is stronger, stiffer, and more rigid than the material that the tip component 120 is formed of. The blade body 102 is made of a material that has a higher modulus than the material that the tip component 120 is formed of. For example, the blade body 102 may be formed of braided or woven composite materials, materials such as intermediate modulus fiber and standard modulus fiber, or any material that is stronger and stiffer than the tip component 120, though it is contemplated that other materials may be used. In this manner, although the tip component 120 may be worn or damaged, the blade body 102 is strong and more resistant to any damage. As described herein, a worn tip component 120 is able to be removed from the blade body 102 and then replaced with a new tip component 120.

In exemplary embodiments, a portion of the blade body 102 and/or a portion of the tip component 120 may be formed from any suitable composite material, e.g., suitable materials used to form a matrix of a final blade body 102 and/or tip component 120 and/or suitable materials that comprise the final blade body 102 and/or tip component 120. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC include, but are not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a matrix material for a MMC include, but are not limited to aluminum, titanium, and combinations thereof. For example, a MMC may be formed from powder metals such as, but not limited to, aluminum powder or titanium powder capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load carrying element.

In an exemplary embodiment, the tip component 120 is made of a material that is less stiff or softer than the material that the blade body 102 is formed of. The tip component 120 is made of a material that has a lower modulus than the material that the blade body 102 is formed of. In exemplary embodiments, the tip component 120 may be formed of rub tolerant materials, shape memory alloys such as TiNi alloys, or any material that is less stiff than the blade body 102, though it is contemplated that other materials may be used.

Furthermore, the tip component 120 may be made of an abradable material. For example, the tip component 120 defines an abradable exterior surface 122 formed of an abradable material. In this manner, any rubbing between the tip component 120 and portions of an engine 10 (FIG. 1) will not wear the engine components and instead will wear down the tip component 120, which may then be replaced with a new tip component.

In other exemplary embodiments, the tip component 120 may be made of a shape-memory alloy that can be deformed during any rubbing between the tip component 120 and portions of an engine 10 (FIG. 1) but will return to its pre-deformed shape, for example, when heated. It is also contemplated that other materials may be used to form the tip component 120.

It is contemplated that the tip component 120 may have any desired geometry or shape to support various aerodynamic features and designs. It is contemplated that a first tip component 120 having a first geometric shape can be removably connected to the blade body 102. When the first tip component 120 having a first geometric shape is removed, a second tip component 120 having a second geometric shape different than the first geometric shape can then be removably connected to the blade body 102.

It is also contemplated that the tip component 120 may have any desired tip stiffness, i.e., tip frangibility, to support various features and designs. It is contemplated that a first tip component 120 having a first tip stiffness can be removably connected to the blade body 102. When the first tip component 120 having a first tip stiffness is removed, a second tip component 120 having a second tip stiffness different than the first tip stiffness can then be removably connected to the blade body 102.

Figure 3:
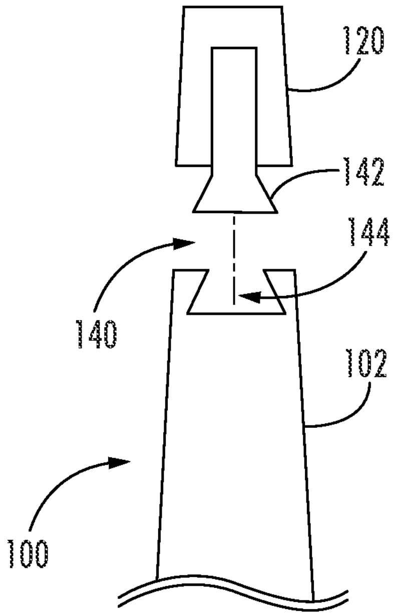
FIG. 3 is a cross-sectional exploded view of a tip component and a blade body of a rotor blade in accordance with an exemplary embodiment of the present disclosure.
Figure 4:
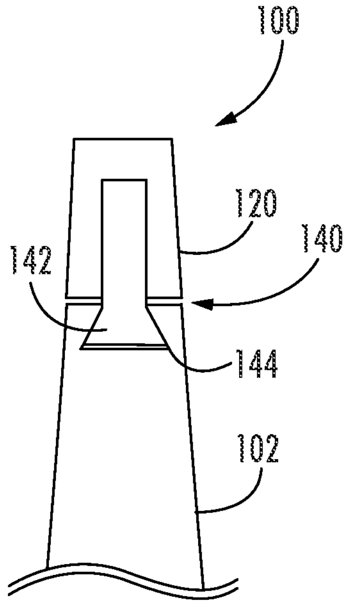
FIG. 4 is a cross-sectional connected view of a tip component and a blade body of a rotor blade in accordance with an exemplary embodiment of the present disclosure.

As illustrated in FIGS. 3 and 4, in a first exemplary embodiment, the rotor blade 100 includes a lock 140 that is connected to the tip component 120 and the blade body 102 and the lock 140 is operable to selectively lock the tip component 120 to the blade body 102. In this manner, the lock 140 is operable to selectively lock the tip component 120 to the blade body 102 so that movement of the tip component 120 relative to the blade body 102 in a radial direction and an axial direction is prevented. In exemplary embodiments, the tip component 120 is removably connected to the blade body 102 via the lock 140.

Referring to FIGS. 3 and 4, in one exemplary embodiment, the lock 140 includes a protrusion 142 extending from the tip component 120 and a slot 144 that is defined within the blade body 102. In such an embodiment, the slot 144 defined within the blade body 102 is sized to receive the protrusion 142 extending from the tip component 120 to selectively lock the tip component 120 to the blade body 102.

In exemplary embodiments, the protrusion 142 extending from the tip component 120 and the slot 144 defined within the blade body 102 have interlocking dovetail shapes. However, it is contemplated that other interlocking shapes may be used, for example, any interlocking geometric features. Furthermore, it is contemplated that any other connection systems between blade body 102 and tip component 120 may be used that allow for the tip component 120 to be removably connected to the blade body 102.

Figure 5:
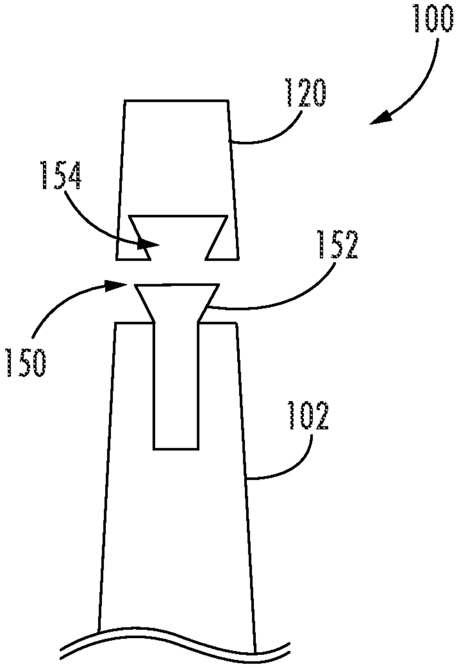
FIG. 5 is a cross-sectional exploded view of a tip component and a blade body of a rotor blade in accordance with another exemplary embodiment of the present disclosure.
Figure 6:
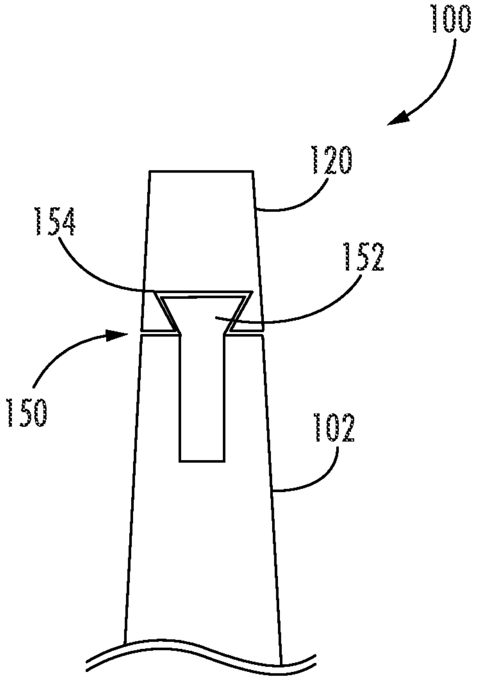
FIG. 6 is a cross-sectional connected view of a tip component and a blade body of a rotor blade in accordance with another exemplary embodiment of the present disclosure.

Another exemplary connection system between a tip component 120 and a blade body 102 of the present disclosure will now be discussed. As illustrated in FIGS. 5 and 6, in another exemplary embodiment, the rotor blade 100 includes a lock 150 that is connected to the tip component 120 and the blade body 102 and the lock 150 is operable to selectively lock the tip component 120 to the blade body 102. In this manner, the lock 150 is operable to selectively lock the tip component 120 to the blade body 102 so that movement of the tip component 120 relative to the blade body 102 in a radial direction and an axial direction is prevented. In exemplary embodiments, the tip component 120 is removably connected to the blade body 102 via the lock 150.

Referring to FIGS. 5 and 6, in one exemplary embodiment, the lock 150 includes a protrusion 152 extending from the blade body 102 and a slot 154 that is defined within the tip component 120. In such an embodiment, the slot 154 defined within the tip component 120 is sized to receive the protrusion 152 extending from the blade body 102 to selectively lock the tip component 120 to the blade body 102.

In exemplary embodiments, the protrusion 152 extending from the blade body 102 and the slot 154 defined within the tip component 120 have interlocking dovetail shapes. However, it is contemplated that other interlocking shapes may be used, for example, any interlocking geometric features. Furthermore, it is contemplated that any other connection systems between blade body 102 and tip component 120 may be used that allow for the tip component 120 to be removably connected to the blade body 102.

Figure 7:
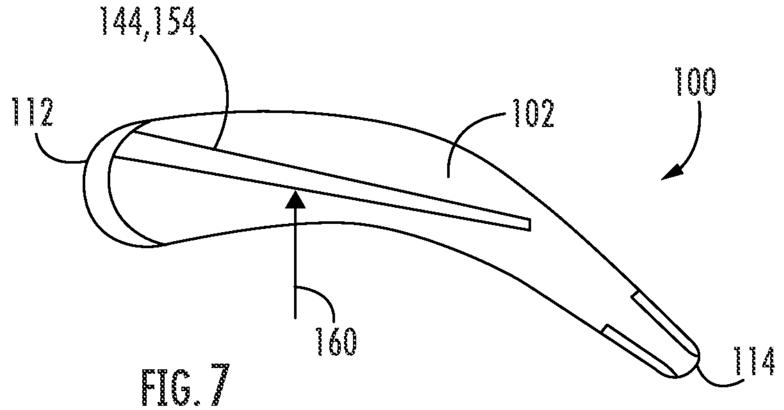
FIG. 7 is a cross-sectional view of a first configuration of a slot of a lock in accordance with an exemplary embodiment of the present disclosure.

Exemplary configurations of slots of a lock of the present disclosure will now be discussed. Referring to FIG. 7, in one exemplary embodiment, a slot 144 that is defined within the blade body 102 (FIGS. 3 and 4) or a slot 154 defined within the tip component 120 (FIGS. 5 and 6) may include a linear axial slot 160.

Figure 8:
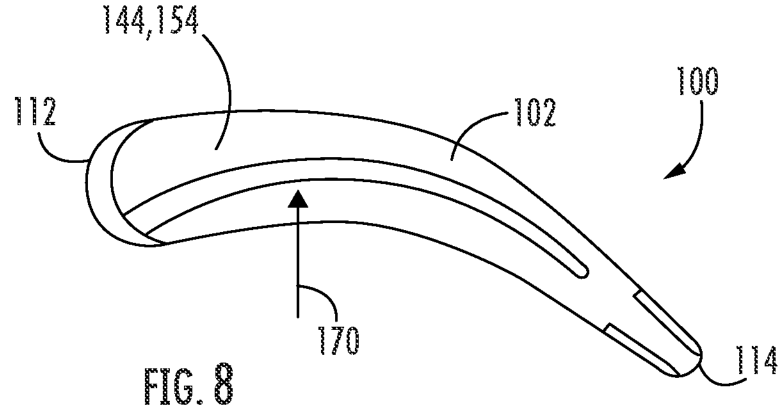
FIG. 8 is a cross-sectional view of a second configuration of a slot of a lock in accordance with another exemplary embodiment of the present disclosure.

Referring to FIG. 8, in another exemplary embodiment, a slot 144 that is defined within the blade body 102 (FIGS. 3 and 4) or a slot 154 defined within the tip component 120 (FIGS. 5 and 6) may include a spherical axial slot 170.

Figure 9:
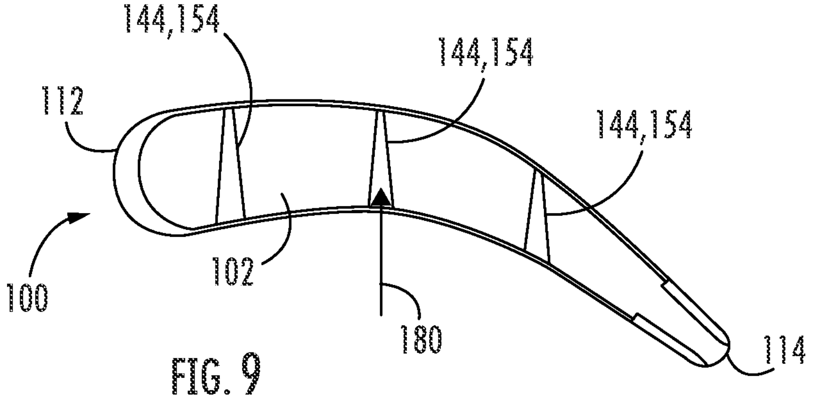
FIG. 9 is a cross-sectional view of a third configuration of a slot of a lock in accordance with another exemplary embodiment of the present disclosure.

Referring to FIG. 9, in yet another exemplary embodiment, a slot 144 that is defined within the blade body 102 (FIGS. 3 and 4) or a slot 154 defined within the tip component 120 (FIGS. 5 and 6) may include linear circumferential slots 180. Furthermore, it is contemplated that any other configurations and/or geometric interlocking designs of a slot of the present disclosure may be used.

Referring to FIG. 2, the tip component 120 has a span dimension STC and the blade body 102 has a span dimension SBB. In one exemplary embodiment, a span dimension STC of the tip component 120 is 20% or less of a span dimension SBB of the blade body 102. In another exemplary embodiment, a span dimension STC of the tip component 120 is 15% or less of a span dimension SBB of the blade body 102. In another exemplary embodiment, a span dimension STC of the tip component 120 is 10% or less of a span dimension SBB of the blade body 102. In another exemplary embodiment, a span dimension STC of the tip component 120 is 5% or less of a span dimension SBB of the blade body 102. It is also contemplated that other shapes and sizes of tip component 120 relative to blade body 102 may be used.

In an exemplary aspect of the present disclosure, a method is provided for repairing a rotor blade having a blade body for a gas turbine engine. The method includes removing a first tip component from the blade body when the first tip component is damaged; and connecting a second tip component to the blade body.

Further aspects of the invention are provided by the subject matter of the following clauses:

1. A rotor blade for a gas turbine engine, the rotor blade comprising: a blade body formed of a first material; and a tip component removably connected to the blade body, the tip component formed of a second material that is different than the first material.
2. The rotor blade of any preceding clause, wherein the tip component defines an abradable exterior surface.
3. The rotor blade of any preceding clause, further comprising a lock connected to the tip component and the blade body, the lock operable to selectively lock the tip component to the blade body.
4. The rotor blade of any preceding clause, wherein the lock is operable to selectively lock the tip component to the blade body so that movement of the tip component relative to the blade body in a radial direction and an axial direction is prevented.
5. The rotor blade of any preceding clause, wherein the tip component is removably connected to the blade body via the lock.

6. The rotor blade of any preceding clause, wherein the lock comprises a protrusion extending from the tip component; and a slot within the blade body, wherein the slot is sized to receive the protrusion to selectively lock the tip component to the blade body.
7. The rotor blade of any preceding clause, wherein the tip component is formed of a shape-memory alloy.
8. The rotor blade of any preceding clause, wherein a span dimension of the tip component is 10% or less of a span dimension of the blade body.
9. The rotor blade of any preceding clause, wherein a span dimension of the tip component is 20% or less of a span dimension of the blade body.
10. The rotor blade of any preceding clause, wherein the second material of the tip component is a less stiff material than the first material of the blade body.
11. A gas turbine engine, comprising: a fan; and a rotor blade positioned within the fan, the rotor blade comprising: a blade body formed of a first material; and a tip component removably connected to the blade body, the tip component formed of a second material that is different than the first material.
12. The gas turbine engine of any preceding clause, wherein the tip component defines an abradable exterior surface.
13. The gas turbine engine of any preceding clause, further comprising a lock connected to the tip component and the blade body, the lock operable to selectively lock the tip component to the blade body.
14. The gas turbine engine of any preceding clause, wherein the lock is operable to selectively lock the tip component to the blade body so that movement of the tip component relative to the blade body in a radial direction and an axial direction is prevented.
15. The gas turbine engine of any preceding clause, wherein the tip component is removably connected to the blade body via the lock.
16. The gas turbine engine of any preceding clause, wherein the lock comprises a protrusion extending from the tip component; and a slot within the blade body, wherein the slot is sized to receive the protrusion to selectively lock the tip component to the blade body.
17. The gas turbine engine of any preceding clause, wherein the tip component is formed of a shape-memory alloy.
18. The gas turbine engine of any preceding clause, wherein a span dimension of the tip component is 20% or less of a span dimension of the blade body.
19. The gas turbine engine of any preceding clause, wherein the second material of the tip component is a less stiff material than the first material of the blade body.
20. A method for repairing a rotor blade having a blade body for a gas turbine engine, the method comprising: removing a first tip component from the blade body when the first tip component is damaged; and connecting a second tip component to the blade body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A rotor blade for a gas turbine engine, the rotor blade comprising:

a blade body formed of a first material, wherein the blade body defines a leading edge, a trailing edge, a root, a tip, a pressure-side surface, a suction-side surface, and a slot that extends between the pressure-side surface and the suction-side surface between the leading edge and the trailing edge of the blade body;

a cap portion disposed over a portion of the leading edge; and a tip component defining an abradable exterior surface at a radial extremity of the rotor blade with respect to the root of the blade body, wherein the tip component is positioned in the slot and removably connected to the blade body, the tip component formed of a second material that is different than the first material, wherein the cap portion extends radially across the tip component to the radial extremity.

2. The rotor blade of claim 1, further comprising a lock connected to the tip component and the blade body, the lock operable to selectively lock the tip component to the blade body.

3. The rotor blade of claim 2, wherein the lock is operable to selectively lock the tip component to the blade body such that movement of the tip component relative to the blade body in a radial direction and in an axial direction is prevented.

4. The rotor blade of claim 2, wherein the tip component is removably connected to the blade body via the lock.

5. The rotor blade of claim 2, wherein the lock comprises:

a protrusion extending from the tip component, wherein the slot is sized to receive the protrusion to selectively lock the tip component to the blade body.

6. The rotor blade of claim 1, wherein the tip component is formed of a shape-memory alloy.

7. The rotor blade of claim 1, wherein a span dimension of the tip component is 10% or less of a span dimension of the blade body.

8. The rotor blade of claim 1, wherein a span dimension of the tip component is 20% or less of a span dimension of the blade body.

9. The rotor blade of claim 1, wherein the second material of the tip component is less stiff than the first material of the blade body.

10. A gas turbine engine, comprising:

a fan; and a rotor blade positioned within the fan, the rotor blade comprising:

a blade body formed of a first material, wherein the blade body defines a leading edge, a trailing edge, a root, a tip, a pressure-side surface, a suction-side surface, and a slot that extends between the pressure-side surface and the suction-side surface between the leading edge and the trailing edge of the blade body;

a cap portion disposed over a portion of the leading edge; and a tip component defining an abradable exterior surface at a radial extremity of the rotor blade with respect to the root of the blade body, wherein the tip component is positioned in the slot and removably connected to the blade body, the tip component formed of a second material that is different than the first material wherein the cap portion extends radially across the tip component to the radial extremity.

11. The gas turbine engine of claim 10, further comprising a lock connected to the tip component and the blade body, the lock operable to selectively lock the tip component to the blade body.

12. The gas turbine engine of claim 11, wherein the lock is operable to selectively lock the tip component to the blade body such that movement of the tip component relative to the blade body in a radial direction and in an axial direction is prevented.

13. The gas turbine engine of claim 11, wherein the tip component is removably connected to the blade body via the lock.

14. The gas turbine engine of claim 11, wherein the lock comprises:

a protrusion extending from the tip component, wherein the slot is sized to receive the protrusion to selectively lock the tip component to the blade body.

15. The gas turbine engine of claim 10, wherein the tip component is formed of a shape-memory alloy.

16. The gas turbine engine of claim 10, wherein a span dimension of the tip component is 20% or less of a span dimension of the blade body.

17. The gas turbine engine of claim 10, wherein the second material of the tip component is less stiff than the first material of the blade body.

* * * * *